(12) United States Patent
Yu et al.

(10) Patent No.: US 10,171,841 B2
(45) Date of Patent: Jan. 1, 2019

(54) METHOD AND DEVICE FOR ENCODING/DECODING VIDEO BITSTREAM

(71) Applicants: ZTE CORPORATION, Guangdong (CN); Lu Yu, Guangdong (CN); Peng Lv, Guangdong (CN); Yin Zhao, Guangdong (CN); Yingjie Hong, Guangdong (CN); Ming Li, Guangdong (CN)

(72) Inventors: Lu Yu, Shenzhen (CN); Peng Lv, Shenzhen (CN); Yin Zhao, Shenzhen (CN); Yingjie Hong, Shenzhen (CN); Ming Li, Shenzhen (CN)

(73) Assignees: ZHEJIANG UNIVERSITY, Hangzhou (CN); XI'AN ZHONGXING NEW SOFTWARE CO., LTD., Xi'An (CN)

( * ) Notice: Subject to any disclaimer, the term of this patent is extended or adjusted under 35 U.S.C. 154(b) by 682 days.

(21) Appl. No.: 14/429,462

(22) PCT Filed: Apr. 24, 2013

(86) PCT No.: PCT/CN2013/074649
§ 371 (c)(1),
(2) Date: Mar. 19, 2015

(87) PCT Pub. No.: WO2013/159705
PCT Pub. Date: Oct. 31, 2013

(65) Prior Publication Data
US 2015/0249841 A1    Sep. 3, 2015

(30) Foreign Application Priority Data

Apr. 25, 2012  (CN) .......................... 2012 1 0125595
Nov. 8, 2012   (CN) .......................... 2012 1 0444341

(51) Int. Cl.
*H04N 19/70* (2014.01)
*H04N 13/00* (2018.01)
(Continued)

(52) U.S. Cl.
CPC ......... *H04N 19/70* (2014.11); *H04N 13/0048* (2013.01); *H04N 19/18* (2014.11); *H04N 19/463* (2014.11); *H04N 19/174* (2014.11)

(58) Field of Classification Search
CPC ..................................................... H04N 19/70
(Continued)

(56) References Cited

U.S. PATENT DOCUMENTS 8,150,174 B2 * 4/2012 Moon ................ H04N 13/0048
                                                      348/36
8,457,155 B2 * 6/2013 Hannuksela ......... H04N 19/597
                                                      370/468
(Continued)

FOREIGN PATENT DOCUMENTS

| CN | 101166282 A | 4/2008 |
| CN | 101273635 A | 9/2008 |
| CN | 102047668 A | 5/2011 |

OTHER PUBLICATIONS

International Search Report for corresponding application PCT/CN2013/074649 filed Apr. 24, 2013; dated Aug. 1, 2013.
(Continued)

Primary Examiner — Leron Beck
(74) Attorney, Agent, or Firm — Cantor Colburn LLP

(57) ABSTRACT

Methods and devices for encoding/decoding a video bitstream are provided. The decoding method includes: a slice bitstream is received, wherein the slice bitstream carries parameter set indication information for indicating a camera parameter set; the camera parameters are acquired from the camera parameter set indicated by the parameter set indica-
(Continued)

tion information; and the slice bitstream is decoded according to the acquired camera parameters. By the present invention, the technical problem of lower encoding/decoding efficiency caused by the fact that encoding/decoding can only be normally implemented by carrying the camera parameters in the slice bitstream in the conventional art is solved, and the technical effect of improving the encoding/decoding efficiency is achieved.

16 Claims, 6 Drawing Sheets

(51) Int. Cl.
*H04N 19/463* (2014.01)
*H04N 19/18* (2014.01)
*H04N 19/174* (2014.01)

(58) Field of Classification Search
USPC .......................................... 375/240.01–240.29
See application file for complete search history.

(56) References Cited

U.S. PATENT DOCUMENTS

| | | | | |
|---|---|---|---|---|
| 8,929,643 B2* | 1/2015 | Kim | ........................... | G06T 7/85 382/154 |
| 9,414,047 B2* | 8/2016 | Norkin | ................ | H04N 13/0048 |
| 2006/0222252 A1* | 10/2006 | Lee | ..................... | H04N 13/0066 382/239 |
| 2007/0081814 A1* | 4/2007 | Ha | ......................... | H04N 19/597 396/310 |
| 2009/0052537 A1* | 2/2009 | Burazerovic | ......... | G06K 9/3233 375/240.15 |
| 2009/0185616 A1* | 7/2009 | Pandit | ................... | H04N 19/597 375/240.01 |
| 2009/0323824 A1* | 12/2009 | Pandit | ................ | H04N 21/2365 375/240.26 |

OTHER PUBLICATIONS

European Search Report for corresponding application EP 13 78 1163; Report dated Oct. 29, 2015.
Heiko Schwarz, et al, Description of 3D Video Coding Technology Proposal by Fraunhofer HHI (HVEC compatible, configuration B), Nov. 22, 2011, XP030051134.
Lins S, "MVC high level syntax: Camera Parameters", 21. JVT Meeting, Oct. 27, 2006, XP030006694.
Lu Yu, "Description of 3D Video Coding Technology Proposal by Zhejiang University", Motion Picture Expert Group, Nov. 28, 2011, XP030051237.
Peng Lu, et al., "3D-AVS HLS: Camera Parameter Set (CPS) for Camera Parameter Signalling", May 1, 2012, XP030053238.

* cited by examiner

METHOD AND DEVICE FOR ENCODING/DECODING VIDEO BITSTREAM

FIELD OF THE INVENTION

The present disclosure relates to the field of multimedia communication, in particular to methods and devices for encoding/decoding video bitstream.

BACKGROUND OF THE INVENTION

A bitstream of a video sequence includes a bitstream directly generated by encoding the image of each frame, and also includes some parameter information, such as the width and the height of the image, and these parameters are usually organized in a syntax structure called parameter set, and are encoded into a parameter set bitstream, such as a Sequence Parameter Set (SPS) and a Picture Parameter Set (PPS) in H.264/Advanced Video Coding (H.264/AVC).

Broadly speaking, the video sequence includes V (V is more than or equal to 1) viewpoints, and each viewpoint includes N (N is more than or equal to 1) frames of images; when V=1, the video sequence is a common single-viewpoint video sequence; and when V is more than 1, the video sequence is usually called multiview video sequence. When a coding standard such as H.264/AVC is used, one frame of image can be divided into multiple slices, and each slice is encoded and decoded. Slice bitstreams are generated by encoding slices, and each slice bitstream is usually considered to include one slice, and also includes some coding parameters of the slice, such as a identification number of a parameter set referred to by the slice. In a hierarchical structure in H.264/AVC, two levels of parameter sets, i.e. a PPS and an SPS, are used for signalling some parameters of the video sequence. Parameter sets can be referred to by the slices, that is, the parameter sets are found according to the identification numbers of the parameter sets in the slices, and the parameters are acquired from the parameter sets. For example, the slices can acquire the parameters, such as profiles and levels, used by the slices from SPS according to the identification numbers of the parameter sets signalled in the slice; and slice can also acquire the information, such as frame numbers of the slice, from PPSs according to the identification number of the PPS signalled in the slices. By utilizing such a mechanism, the slices can also derive more information in combination with its own information and information in the parameter sets referred to by the slices, for example: the decoding order of the view containing the current slice can be derived as "view order index" based on the order of the view containing the current slice and the view decoding order signalled in the SPS referred to by the current slice. For example, a certain video sequence consists of three viewpoints with viewpoint numbers of 3, 7 and 9 respectively, the viewpoint number of the viewpoint where a certain slice is located is 9, a viewpoint decoding order signalled in the SPS referred to by the slice is 7-3-9 (it is indicated that the viewpoint with the viewpoint number 7 may be decoded first, the decoding order of this viewpoint is 1, and similarly, the decoding order of the viewpoint with the viewpoint number 3 is 2 and the decoding order of the viewpoint with the viewpoint number 9 is 3), and both the decoding order index and view order index of the view containing the slice are 3. The view order index of the view containing the slice is directly included in the information of the slice sometimes, and can be directly obtained without derivation based on the information in the parameter set referred to by the slice.

Along with the development of a technology, particularly the development of a three-dimensional image acquisition technology and three-dimensional display equipment, the video sequence may include the depth information of one or more viewpoints besides the texture information of the one or more viewpoints, and may also include camera parameters of the one or more viewpoints. The camera parameters can include intrinsic parameters such as a focal length and extrinsic parameters such as a distance of a camera relative to a certain reference point; and when the video sequence includes the depth information, the camera parameters usually may include a depth numerical value of the furthest plane and a depth numerical value of the nearest plane, which correspond to the depth information. The camera parameters of the video sequence may be parameters necessary for the decoding of the texture information or depth information of the video sequence, and may also be parameters necessary for the synthesis of the texture information or depth information of virtual viewpoints, so that the camera parameters are required to be encoded into bitstreams for transmission under some applications.

A bitstream is a bit string, and a segment of bitstream is usually formed by converting a plurality of numerical values into codewords in a binary form and connecting each codeword according to a certain sequence. The bitstream parsing rules and code tables specified in a encoding method and a decoding method must be consistent, so that a bitstream generated by encoding can be correctly divided into multiple codewords by the decoding method, an actual meaning corresponding to the bitstream can be found according to the code table (for example which intra-frame prediction modes are used for multiple macroblocks respectively), and a decoding process corresponding to the codewords can be correctly conducted. Meanwhile, the overall bitstream of a video consists of multiple segments of bitstreams representing different meanings, for example, each of a bitstream corresponding to the camera parameters and a bitstream corresponding to picture contents is a part of the bitstream of the video sequence. Therefore, bitstream organization used by an encoder and a decoder for multiple segments of bitstreams are required to be kept consistent.

A process of converting a numerical value, or called a symbol, with an actual meaning into a codeword in a form of bit string is usually called entropy coding, which is a mature. The common entropy coding methods comprise: N-bit fixed-length coding, Exponential-Golomb, Lempel-Ziv-Welch (LZW) coding, Run-length encoding, Shannon coding, Huffman coding and arithmetic coding. Each entropy coding method has its own advantages. A symbol can also be divided into multiple sub-symbols, and a codeword is formed as the bitstreams generated by entropy coding of each sub-symbol. For example, a number can be expressed or approximately expressed as three combinations of multiple bits, and a typical example is that an Institute of Electrical and Electronic Engineers (IEEE) floating point number form specified by an IEEE 754 standard defines a 32-bit single-precision floating point number, a 64-bit double-precision floating point number and a 128-bit extended-precision floating point number; and on the other hand, multiple symbols can be joint-coded into a codeword, for example, two symbols can be mapped to a codeword by a two-dimensional code table.

When the encoder and the decoder reach an agreement that some symbols can be obtained by context information at the decoder end under a certain condition, the symbols are not required to be written into the bitstream, and under such a condition, these codewords are usually called default codewords, and the symbols are called default symbols. Of course, due to design defects of the coding method and the decoding method or other requirements, for example, the error resistance, some bitstreams still include the default codewords, and correspondingly, the coding efficiency is reduced. The encoder and the decoder also reach an agreement about the adoption of a fixed mode for processing sometimes, for example, Inverse Discrete Cosine Transform (IDCT) is adopted for the H.264/AVC standard, and the method adopted under such a condition is usually called a default method.

V (V is more than or equal to 1) video sequences, each of which has different viewpoints, form a multiview video sequence, wherein the video sequence of each viewpoint usually includes N (N is more than or equal to 1) temporally-synchronized frames, and each frame of the video sequence corresponds to M (M is more than or equal to 1) types of camera parameters. The V*M camera parameters corresponding to the V different viewpoints at the same moment form a camera parameter subset, F (F is more than or equal to 1 and less than or equal to N) camera parameter subsets usually form a camera parameter set, and the camera parameter set includes V*F*M camera parameters.

The camera parameters of each type of each viewpoint can form a camera parameter vector including F camera parameters; and furthermore, the camera parameters of a certain type of the V viewpoints are combined into a two-dimensional camera parameter matrix including V*F camera parameters. A simple method for coding the two-dimensional camera parameter matrix is to perform entropy coding to convert each camera parameter in the camera parameter matrix of each camera into a codeword and sequentially connect the codewords to form a bitstream.

Usually, the camera parameters of the camera parameter vector formed by the camera parameters of the same type have certain temporal correlation; meanwhile, the camera parameter vectors of the two-dimensional camera parameter matrix formed by the camera parameter vectors of the same type have certain correlation. For example, multiple temporally-adjacent camera parameters of the video sequence may have the same value, that is, one camera parameter in each camera parameter vector may be predicted according to another temporal parameter, so that a Run-length encoding method can be adopted for coding; one camera parameter in the video sequence of one viewpoint and a parameter of a temporally corresponding frame in the video sequence of another viewpoint may have the same value, that is, a camera parameter may be unidirectionally predicted according to another time related temporal parameter, and a difference between a real value and a predicted value can be recoded in a direct coding or Run-length encoding manner; and one camera parameter in the video sequence of one viewpoint may be the same as the weighted sum of the parameters of the temporally corresponding frames of other two viewpoints, that is, a camera parameter may be bidirectionally predicted according to the other two time related temporal camera parameters, and a difference between the real value and a predicted value can be recoded in a direct coding or Run-length encoding manner. Therefore, the joint coding of the camera parameter vector or the two-dimensional camera parameter matrix can utilize the correlation of the parameters in the vector or the matrix, thereby converting the correlation into a simpler expression manner. For example, the camera parameter vector can be encoded by virtue of Run-length encoding; and the other camera parameter vectors can also be coded in a unidirectional or bidirectional prediction manner by virtue of the encoded camera parameter vector.

In the conventional H.264/AVC standard, the camera parameters can only be included in a grammatical structure Supplemental Enhancement Information (SEI). SEI is independent of video image contents, and is configured to store film introduction, copyright information, data defined by a user and the like, and is not referred to in coding and decoding processes of each slice, or the coding and decoding of a video image are irrelevant to SEI. However, for a three-dimensional video sequence including the depth information, the camera parameters are required by each frame in the coding and decoding processes, for example, the camera parameters are used for synthesizing a target viewpoint image as a viewpoint reference frame, i.e. view synthesis prediction which is often mentioned. For such a three-dimensional video sequence, if the camera parameters are included in SEI according to a technology in the conventional H.264/AVC standard, each slice cannot refer to the required camera parameters in the coding and decoding processes, so that the coding and decoding processes cannot be normally implemented. If the camera parameters are included in the slices, the coding and decoding processes can be normally implemented, but the coding efficiency is very low.

Similar problems exist in similar video coding and decoding standards such as an Audio Video Standard (AVS) and High Efficiency Video Coding.

At present, there have yet been some solutions to the problem, for example:

in Chinese invention patent "video bitstream" with the application number 2011103746640, camera parameter sets are used for transmitting camera parameters, and a citing relationship between slices and the camera parameter sets and a corresponding relationship between the slices and the camera parameters are established, that is, a slice can refer to the camera parameter set of which a camera parameter set identification number is that included in the slice according to the camera parameter set identification number of the camera parameter set in the slice, and is required to acquire the corresponding camera parameters from the camera parameter set referred to by the slice according to a frame number of a frame where the slice is located. The method has the defects that: (1) the slice is required to acquire the corresponding camera parameters from the camera parameter set referred to by the slice according to the frame number of the frame where the slice is located, while each camera parameter set may include the camera parameters of multiple frames, so that the camera parameter set must indicate the frame numbers of the frames included therein, otherwise the slice cannot acquire the corresponding camera parameters according to the frame number of the frame where the slice is located, which causes the waste of coding rate; and (2) as mentioned before, each frame can be divided into multiple slices, and the frame number of the frame where different slices of the same frame are located is the same, so that the camera parameters corresponding to different slices in the same frame are the same in the method; however, in a practical application, the camera parameters corresponding to different slices in the same frame may be different, so that the requirements of the application cannot be met by the method.

In Chinese invention patent "video bitstream and decoding method for same" with the application number 2012100217669, camera parameter sets are used for transmitting camera parameters similarly, and a corresponding relationship between frame images and the camera parameters in the camera parameter sets is established, that is, frames can acquire the camera parameters from the corresponding camera parameter sets according to view order indices of viewpoints where the frames are located and their frame numbers. The method has the defects that: (1) the frames can acquire the camera parameters from the corresponding camera parameter sets according to the view order indices of the viewpoints where the frames are located and their frame numbers, so that the view order indices of the viewpoints corresponding to the camera parameter sets and frame numbers of starting frames in the viewpoints corresponding to the camera parameter sets are required to be included in the camera parameter sets, the frame numbers of the frames in the camera parameter sets are required to be continuous, otherwise the frames cannot acquire the camera parameters from the corresponding camera parameter sets according to the view order indices of the viewpoints where the frames are located and their frame numbers, which causes the waste of coding rate waste; and (2) as mentioned before, each frame can be divided into multiple slices, and the frame number of the frame where different slices of the same frame are located is the same, so that the camera parameters corresponding to different slices in the same frame are the same in the method; however, in a practical application, the camera parameters corresponding to different slices in the same frame may be different, so that the requirements of the application cannot be met by the method.

SUMMARY OF THE INVENTION

The embodiment of the present disclosure provides methods and devices for encoding and decoding a video bitstream, so as to at least solve the technical problem of low encoding and decoding efficiency caused by the fact that encoding and decoding can only be normally implemented by carrying camera parameters in a slice bitstream in the conventional art.

According to one aspect of the embodiment of the present disclosure, a decoding method is provided, and the method includes: a slice bitstream is decoded to obtain parameter set indication information for indicating a camera parameter set in the slice bitstream; the camera parameters are acquired from the camera parameter set indicated by the parameter set indication information; and the slice bitstream is decoded according to the acquired camera parameters.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the camera parameter set includes at least one camera parameter subset, and one slice bitstream refers to one camera parameter subset.

Preferably, under the condition that the camera parameter set includes two or more than two camera parameter subsets, the slice bitstream also carries subset indication information for indicating the camera parameter subsets, the step of acquiring the camera parameters from the camera parameter set indicated by the parameter set indication information includes: the camera parameter set indicated by the parameter indication information is searched; the camera parameter subset indicated by the subset indication information is determined from the found camera parameter set; and the camera parameters are acquired from the determined camera parameter subset.

Preferably, each camera parameter set includes $V*F*M$ camera parameters, wherein V represents the number of the viewpoints included in the camera parameter set, F represents the number of the camera parameter subsets included in the camera parameter set, M represents the number of the types of the camera parameters included in the camera parameter set, and V, F and M are positive integers.

Preferably, the slice bitstream also carries viewpoint indication information for indicating the viewpoints and the subset indication information for indicating the camera parameter subsets.

Preferably, before the camera parameters are acquired from the camera parameter set indicated by the parameter set indication information, the method includes: a video bitstream carrying the camera parameter set is received; the video bitstream is decoded to obtain one or more camera parameters; and the one or more camera parameters obtained by decoding are stored as the camera parameter set.

Preferably, the step of storing the one or more camera parameters obtained by decoding as the camera parameter set includes: under the condition that a parameter set identification number of the camera parameter set obtained by decoding is the same as that of a camera parameter set which has been stored at present, the camera parameter set obtained by decoding is stored by replacing the stored camera parameter set with the same parameter set identification number.

Preferably, the step of storing the one or more camera parameters obtained by decoding as the camera parameter set includes: the one or more camera parameters are stored in an array form, wherein one array corresponds to one camera parameter set.

According to another aspect of the embodiment of the present disclosure, a decoding method is provided, which includes: a slice bitstream is received, wherein the slice bitstream carries parameter set indication information for indicating a camera parameter set; the camera parameters are acquired from the camera parameter set indicated by the parameter set indication information; and the slice bitstream is decoded according to the acquired camera parameters.

Preferably, the camera parameter set includes at least one camera parameter subset, and one slice bitstream refers to one camera parameter subset.

Preferably, under the condition that the camera parameter set includes two or more than two camera parameter subsets and the slice bitstream also carries subset indication information for indicating the camera parameter subsets, the step of acquiring the camera parameters from the camera parameter set indicated by the parameter set indication information includes: the camera parameter set indicated by the parameter camera indication information is searched; the camera parameter subset indicated by the subset indication information is determined from the found camera parameter set; and the camera parameters are acquired from the determined camera parameter subset.

Preferably, each camera parameter set includes $V*F*M$ camera parameters, wherein V represents the number of viewpoints included in the camera parameter set, F represents the number of the camera parameter subsets included in the camera parameter set, M represents the number of the types of the camera parameters included in the camera parameter set, and V, F and M are positive integers.

Preferably, the slice bitstream also carries viewpoint indication information for indicating the viewpoints and the subset indication information for indicating the camera parameter subsets.

Preferably, before the camera parameters are acquired from the camera parameter set indicated by the parameter set indication information, the method includes: a video bitstream carrying the camera parameter set is received; the video bitstream is decoded to obtain one or more camera parameters; and the one or more camera parameters obtained by decoding are stored as the camera parameter set.

Preferably, the step of storing the one or more camera parameters obtained by decoding as the camera parameter set includes: under the condition that a parameter set identification number of the camera parameter set obtained by decoding is the same as that of a camera parameter set which has been stored at present, the camera parameter set obtained by decoding is stored by replacing the stored camera parameter set with the same parameter set identification number.

Preferably, the step of storing the one or more camera parameters obtained by decoding as the camera parameter set includes: the one or more camera parameters are stored in an array form, wherein one array corresponds to one camera parameter set.

According to another aspect of the embodiment of the present disclosure, an encoding method is provided, and the method includes: one or more camera parameters are extracted from the content of a current video; the one or more camera parameters are encoded into a video bitstream as a camera parameter set; and the video bitstream carrying the camera parameter set is transmitted.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the camera parameter set includes at least one camera parameter subset, and one slice bitstream corresponds to each camera parameter subset.

Preferably, each camera parameter set includes V*F*M camera parameters, wherein V represents the number of the viewpoints included in the camera parameter set, F represents the number of the camera parameter subsets included in the camera parameter set, M represents the number of the types of the camera parameters included in the camera parameter set, and V, F and M are positive integers.

According to another aspect of the embodiment of the present disclosure, a encoding method is provided, and the method includes: the camera parameters for decoding a slice bitstream to be transmitted are determined; the parameter set indication information for a camera parameter set where the camera parameters are included is encoded into the slice bitstream; and the slice bitstream carrying the parameter set indication information is transmitted.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, when the camera parameter set includes two or more than two camera parameter subsets, the step of coding the parameter indication information for the camera parameter set where the camera parameters are included into the slice bitstream includes: the parameter set indication information and subset indication information for indicating the camera parameter subsets are carried in the slice bitstream, wherein one slice bitstream refers to one camera parameter subset.

Preferably, each camera parameter set includes V*F*M camera parameters, wherein V represents the number of the viewpoints included in the camera parameter set, F represents the number of the camera parameter subsets included in the camera parameter set, M represents the number of the types of the camera parameters included in the camera parameter set, and V, F and M are positive integers.

Preferably, the slice bitstream also carries viewpoint indication information for indicating the viewpoints and the subset indication information for indicating the camera parameter subsets.

According to another aspect of the embodiment of the present disclosure, a decoding device is provided, and the device includes: a parsing unit, configured to decode a slice bitstream to obtain parameter set indication information for indicating a camera parameter set in the slice bitstream; an acquisition unit, configured to acquire camera parameters from the camera parameter set indicated by the parameter set indication information; and a decoding unit, configured to decode the slice bitstream according to the acquired camera parameters.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the acquisition unit includes: a first searching module, configured to search for the camera parameter set indicated by the parameter set indication information; a second searching module, configured to, under the condition that the camera parameter set includes two or more than two camera parameter subsets and the slice bitstream also carries subset indication information for indicating the camera parameter subsets, determine the camera parameter subset indicated by the subset indication information from the found camera parameter set; and an acquisition module, configured to acquire the camera parameters from the determined camera parameter subset.

Preferably, the device further includes: a receiving unit, configured to, before the camera parameters are acquired from the camera parameter set indicated by the parameter set indication information, receive a video bitstream carrying the camera parameter set; a decoding unit, configured to decode the video bitstream to obtain one or more camera parameters; and a storage unit, configured to store the one or more camera parameters obtained by decoding as the camera parameter set.

Preferably, the storage unit includes: a storage module, configured to, under the condition that a parameter set identification number of the camera parameter set obtained by decoding is the same as that of a camera parameter set which has been stored at present, store the camera parameter set obtained by decoding by replacing the stored camera parameter set with the same parameter set identification number.

According to another aspect of the embodiment of the present disclosure, a decoding device is provided, and the device includes: a receiving unit, configured to receive a slice bitstream, wherein the slice bitstream carries parameter set indication information for indicating a camera parameter set; an acquisition unit, configured to acquire camera parameters from the camera parameter set indicated by the parameter set indication information; and a decoding unit, configured to decode the slice bitstream according to the acquired camera parameters.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the acquisition unit includes: a first searching module, configured to search for the camera parameter set indicated by the parameter camera indication information; a second searching module, configured to, under the condition that the camera parameter set includes two or more than two camera parameter subsets and the slice bitstream also carries subset indication information for indicating the camera parameter subsets, determine the camera parameter subset indicated by the subset indication information from the found camera parameter set; and an acquisition module, configured to acquire the camera parameters from the determined camera parameter subset.

Preferably, the device further includes: a receiving unit, configured to, before the camera parameters are acquired from the camera parameter set indicated by the parameter set indication information, receive a video bitstream carrying the camera parameter set; a decoding unit, configured to decode the video bitstream to obtain one or more camera parameters; and a storage unit, configured to store the one or more camera parameters obtained by decoding as the camera parameter set.

Preferably, the storage unit includes: a storage module, configured to, under the condition that a parameter set identification number of the camera parameter set obtained by decoding is the same as that of a camera parameter set which has been stored at present, store the camera parameter set obtained by decoding by replacing the stored camera parameter set with the same parameter set identification number.

According to another aspect of the embodiment of the present disclosure, a encoding device is provided, the device includes: an extraction unit, configured to extract one or more camera parameters from content of a current frame; a encoding unit, configured to encode the one or more camera parameters into a video bitstream as a camera parameter set; and a transmission unit, configured to transmit the video bitstream carrying the camera parameter set.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the encoding unit includes: an encoding module, configured to encode the one or more camera parameters into the video bitstream as the camera parameter set, wherein the camera parameter set includes at least one camera parameter subset, and one slice bitstream refers to one camera parameter subset.

According to another aspect of the embodiment of the present disclosure, an encoding device is provided, and the device includes: a determination unit, configured to determine camera parameters used for decoding a slice bitstream to be transmitted; an encoding unit, configured to encode parameter set indication information for a camera parameter set, where the camera parameters are included, into the slice bitstream; and a transmission unit, configured to transmit the slice bitstream carrying the parameter set indication information.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the encoding unit includes: an encoding module, configured to, under the condition that the camera parameter set includes two or more than two camera parameter subsets, carry the parameter set indication information and subset indication information for indicating the camera parameter subsets in the slice bitstream.

According to another aspect of the embodiment of the present disclosure, a encoding method for a video bitstream is provided, the includes: coding camera parameters of a video sequence into a camera parameter set bitstream, and writing the camera parameter set bitstream into the video bitstream, wherein the camera parameter set bitstream includes at least one camera parameter set, each camera parameter set includes V*F*M camera parameters, V represents the number of viewpoints included in the camera parameter set, F represents the number of camera parameter subsets included in the camera parameter set, and M represents the number of types of the camera parameters included in the camera parameter set; the camera parameter set also includes a camera parameter set identification number C of the camera parameter set; and V, F and M are positive integers, and C is a non-negative integer.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the video bitstream includes at least one slice bitstream, and the method further includes: when the number of the camera parameter subsets included in the camera parameter set referred to by a slice included in the slice bitstream is more than 1, writing the camera parameter set identification number C of the camera parameter set referred to by the slice and a camera parameter subset index number D of the camera parameter subset referred to by the slice into the video bitstream, wherein D is a non-negative integer; and/or writing the camera parameter set identification number C of the camera parameter set referred to by the slice into the video bitstream, wherein the number of the camera parameter subsets included in the camera parameter set referred to by the slice is 1.

According to another aspect of the embodiment of the present disclosure, a decoding method for a video bitstream is provided, which includes: decoding a camera parameter set bitstream from the video bitstream, wherein decoding the camera parameter set bitstream at least includes decoding a camera parameter set; and decoding the camera parameter set bitstream at least includes: performing decoding to obtain a camera parameter set identification number C of the camera parameter set and a camera parameter array including V*F*M elements, wherein each element in the camera parameter array is a camera parameter, V represents the number of viewpoints included in the camera parameter set, F represents the number of camera parameter subsets included in the camera parameter set, M represents the number of types of the camera parameters included in the camera parameter set, V, F and M are positive integers, and C is a non-negative integer.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the method further includes: decoding at least one slice bitstream from the video bitstream, wherein decoding the slice bitstream includes: performing decoding to obtain a view order index E of the viewpoint containing the slice, a camera parameter set identification number C of the camera parameter set referred to by the slice and a camera parameter subset index number D of the camera parameter subset referred to by the slice; and acquiring M camera parameters from the camera parameter array obtained by decoding the camera parameter set referred to by the slice as the camera parameters corresponding to the slice according to the camera parameter set identification number C, the camera parameter subset index number D and the view order index E, wherein E is a non-negative integer.

According to another aspect of the embodiment of the present disclosure, a coding device for a video bitstream is provided, which includes: a camera parameter set bitstream generation module, configured to encode camera parameters of a video sequence into a camera parameter set bitstream, divide the camera parameters into at least one camera parameter set and encode the camera parameter set into the camera parameter set bitstream, wherein the input of the camera parameter set bitstream generation module is the camera parameters corresponding to the video sequence, while the output is the camera parameter set bitstream and the division information of the camera parameter set; and a camera parameter set bitstream writing module, configured to write the camera parameter set bitstream into the video bitstream, wherein the input of the camera parameter bitstream writing module is the camera parameter set bitstream and the video bitstream, while the output is the video bitstream including the camera parameter set bitstream, the camera parameter set bitstream includes at least one camera parameter set, each camera parameter set includes V*F*M camera parameters, V represents the number of viewpoints included in the camera parameter set, F represents the number of camera parameter subsets included in the camera parameter set, and M represents the number of types of the camera parameters included in the camera parameter set; the camera parameter set also includes a camera parameter set identification number C of the camera parameter set; and V, F and M are positive integers, and C is a non-negative integer.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the device further includes: a slice encoding module, of which the input is the video bitstream including at least one slice bitstream and the division information of the camera parameter set, configured to generate the video bitstream according to one of the following operations: under the condition that when the number of the camera parameter subsets included in the camera parameter set referred to by a slice included in the slice bitstream is more than 1, the output of the slice encoding module is the video bitstream including at least one slice bitstream and the slice bitstream includes the camera parameter set identification number C of the camera parameter set referred to by the slice and a camera parameter subset index number D of the camera parameter subset referred to by the slice, the camera parameter set identification number C of the camera parameter set referred to by the slice and the camera parameter subset index number D of the camera parameter subset referred to by the slice are written into the video bitstream; or under the condition that the output of the slice encoding module is the video bitstream including at least one slice bitstream and the slice bitstream includes the camera parameter set identification number C of the camera parameter set referred to by the slice, the camera parameter set identification number C of the camera parameter set referred to by the slice is written into the video bitstream, wherein the number of the camera parameter subset included in the camera parameter set referred to by the slice is 1.

According to another aspect of the embodiment of the present disclosure, a decoding device for a video bitstream is provided, which includes: a camera parameter set bitstream extraction module, configured to extract a camera parameter set bitstream from the video bitstream, wherein the camera parameter set bitstream includes the camera parameter information of a video sequence, the input of the camera parameter set bitstream extraction module is the video bitstream, while the output is the camera parameter set bitstream; and a camera parameter set bitstream decoding module, configured to decode the camera parameter set bitstream to obtain camera parameters of the video sequence, wherein the input of the camera parameter set bitstream decoding module is the camera parameter bitstream, while the output is a camera parameter array of the video sequence; decoding the camera parameter set bitstream at least includes decoding a camera parameter set, and decoding the camera parameter set at least includes: performing decoding to obtain a camera parameter set identification number C of the camera parameter set and the camera parameter array including V*F*M elements, wherein each element in the array is a camera parameter, V represents the number of viewpoints included in the camera parameter set, F represents the number of camera parameter subsets included in the camera parameter set, M represents the number of types of the camera parameters included in the camera parameter set, V, F and M are positive integers, and C is a non-negative integer.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Preferably, the device further includes: a slice bitstream extraction module, configured to extract a slice bitstream from the video bitstream, wherein the input of the slice bitstream extraction module is the video bitstream, while the output is the slice bitstream, and the slice bitstream has at least one of the characteristics that: when the number of the camera parameter subsets included in the camera parameter set referred to by a slice included in the slice bitstream is more than 1, the slice bitstream includes the camera parameter set identification number C of the camera parameter set referred to by the slice and a camera parameter subset index number D of the camera parameter subset referred to by the slice; or the slice bitstream includes the camera parameter set identification number C of the camera parameter set referred to by the slice, and the number of the camera parameter subset include in the camera parameter set referred to by the slice is 1; and a camera parameter acquisition module, configured to decode the slice bitstream and obtain the camera parameters corresponding to the slice, wherein the input of the camera parameter acquisition module is the slice bitstream and the camera parameter array, while the output is the camera parameters corresponding to the slice; decoding the slice bitstream and obtaining the camera parameters corresponding to the slice include: decoding the slice bitstream to obtain a view order index E of the viewpoint where the slice is located, the camera parameter set identification number C of the camera parameter set referred to by the slice and the camera parameter subset index number D of the camera parameter subset referred to by the slice, and acquiring the camera parameters corresponding to the slice from the camera parameter array according to the obtained camera parameter set identification number C, camera parameter subset index number D and view order index E.

According to another aspect of the embodiment of the present disclosure, a video bitstream is provided, which includes: at least one camera parameter set, wherein each camera parameter set includes V*F*M camera parameters, V is the number of viewpoints included in the camera parameter set, F is the number of camera parameter subsets included in the camera parameter set and M is the number of types of camera parameters included in the camera parameter set; and he camera parameter set also includes a camera parameter set identification number C of the camera parameter set, wherein V, F and M are positive integers, and C is a non-negative integer.

Preferably, the video bitstream further includes at least one slice bitstream, and the slice bitstream has the characteristics that: when the number of the camera parameter subsets included in the camera parameter set referred to by a slice included in the slice bitstream is more than 1, the slice bitstream includes the camera parameter set identification number C of the camera parameter set referred to by the slice and a camera parameter subset index number D of the camera parameter subset referred to by the slice; and/or the slice bitstream includes the camera parameter set identification number C of the camera parameter set referred to by the slice, and the number of the camera parameter subset include in the camera parameter set referred to by the slice is 1.

According to the embodiment of the present disclosure, one or more camera parameter sets are pre-stored at a decoding end, and an encoding end carries the indication information of the camera parameter set where the camera parameters used for the slice bitstream are included in the slice bitstream, so that the decoding end can acquire the corresponding camera parameters from the locally stored camera parameter sets to finish decoding according to the indication information, the technical problem of low coding and decoding efficiency caused by the fact that the coding and decoding processes can only be normally implemented by carrying the camera parameters in the slice bitstream in the prior art is solved, and a technical effect of improving the coding and decoding efficiency is achieved. Meanwhile, the amount of the indication information is generally much smaller than the data volume of the camera parameters, so that information required to be carried in the slice bitstream is effectively reduced in such a manner.

BRIEF DESCRIPTION OF THE DRAWINGS

The drawings are described here to provide further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present disclosure and the characteristics in the embodiments can be combined under the condition of no conflicts.

Figure 1:
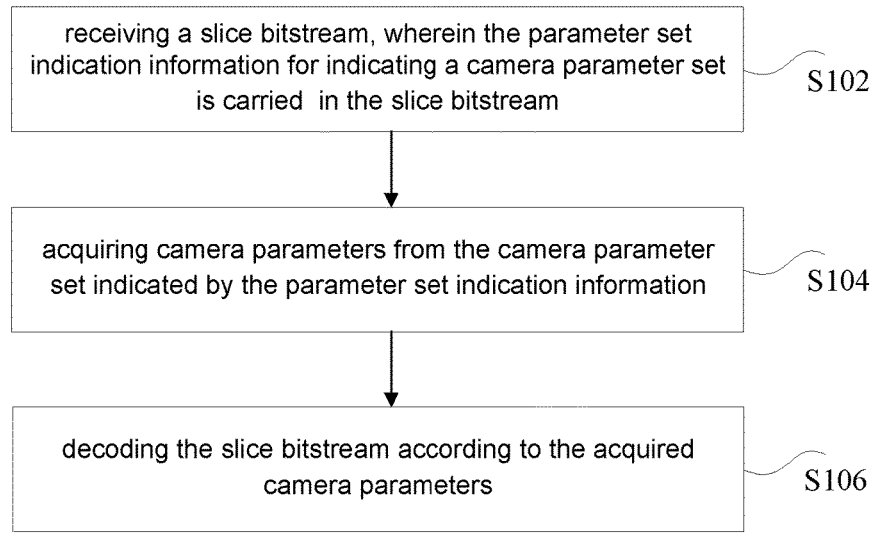
FIG. 1 is a flowchart of an encoding method according to an embodiment of the present disclosure.

The embodiment of the present disclosure provides a decoding method, as shown in FIG. 1, including the following steps of:

Step 102: a slice bitstream is received, wherein the slice bitstream carries parameter set indication information for indicating a camera parameter set;

Step 104: the camera parameters are acquired from the camera parameter set indicated by the parameter set indication information; and Step 106: the slice bitstream is decoded according to the acquired camera parameters.

In the preferred implementation mode, one or more camera parameter sets are pre-stored at a decoding end, and a coding end carries the indication information of the camera parameter set where the camera parameters used by the slice bitstream are included in the slice bitstream, so that the decoding end can acquire the corresponding camera parameters from the locally stored camera parameter sets to finish decoding according to the indication information, the technical problem of low coding and decoding efficiency caused by the fact that the coding and decoding processes can only be normally implemented by carrying the camera parameters in the slice bitstream in the prior art is solved, and a technical effect of improving the coding and decoding efficiency is achieved. Meanwhile, the amount of the indication information is generally much smaller than the data volume of the camera parameters, so that information required to be carried in the slice bitstream is effectively reduced in such a manner. Sometimes, slices in different frames and even different slices in the same frame may refer to different camera parameters, and according to the concept of the camera parameter set, only the indication information (for example, an identification number) of the camera parameter set corresponding to different camera parameters referred to by a certain slice is only required to be carried in the slice bitstream; and similarly, if different slices refer to the same camera parameters, only the same indication information of the camera parameter set is required to be carried in the slice bitstream.

The embodiment of the present disclosure also provides another preferred decoding method, which includes: decoding a slice bitstream to obtain parameter set indication information for indicating a camera parameter set in the slice bitstream; acquiring camera parameters from the camera parameter set indicated by the parameter set indication information; and decoding the slice bitstream according to the acquired camera parameters.

It is worth noting that parsing and decoding are two different data processing processes under normal circumstances. Parsing mainly refers to reading binary bits of each field from the bitstream and converting of the binary bits to a numerical value of a functional variable corresponding to the field. Decoding refers to the reconstruction and recovery of video data according to the numerical value of the functional variable corresponding to each field. However, in the process of parsing a bitstream, the expression "decoding a bitstream" is often used, so that the above-mention operation of decoding a slice bitstream refers to the parsing of the slice bitstream.

Preferably, the camera parameter set is a parameter set data structure including one or more of the following types of camera parameters: camera intrinsic parameters, camera extrinsic parameters, furthest depth plane parameters of depth data for the viewpoints and nearest depth plane parameters of the depth data for the viewpoints.

Wherein, the camera intrinsic parameters refer to own characteristic parameters of cameras, for example: focal lengths of lenses; the camera extrinsic parameters refer to extrinsic characteristic parameters of the cameras, for example: distances between the cameras; the furthest depth plane parameters of the depth data for the viewpoints refer to distance parameters related to planes furthest from the cameras related to depth data quantification representation; and the nearest depth plane parameters of the depth data for the viewpoints refer to distance parameters related to planes nearest to the cameras related to the depth data quantification representation.

Considering that the camera parameters corresponding to different frames of the same video sequence have certain correlation, a prediction method is frequently used for reducing a volume of the bitstream. For example, a camera parameter in a camera parameter set is 10000, the next camera parameter is 10001, then only 10000 and then a difference of 1 are needed to be transmitted or stored, and the camera parameter 100001 can be obtained in a manner of adding 1. However, such a manner has a certain problem, that is, a wrong 10000 may directly cause a wrong 10001, and an error is easily propagated, and is difficult to control particularly when the two parameters belong to different camera parameter sets, that is, the camera parameters are predicted between different camera parameter sets. Preferably, the camera parameter set can be divided into one or more camera parameter subsets, and one slice bitstream corresponds to one subset in the camera parameter set. Only the prediction of each subset within the camera parameter set is permitted, so that the error can be effectively controlled.

In such a manner, each slice bitstream in the video bitstream corresponds to the indication information (for example: identification number) of own camera parameter subset, and correspondingly, the camera parameter subset where the camera parameters used for decoding the slice bitstream are included can be determined according to the identification number, so that the corresponding camera parameters can be acquired. In such a manner, the problem that different slices in the same frame adopt different camera parameters or the slices in different frames adopt the same camera parameters due to the fact that the camera parameters are determined according to frame numbers in the prior art is solved, and the coding and decoding efficiency is improved.

Figure 2:
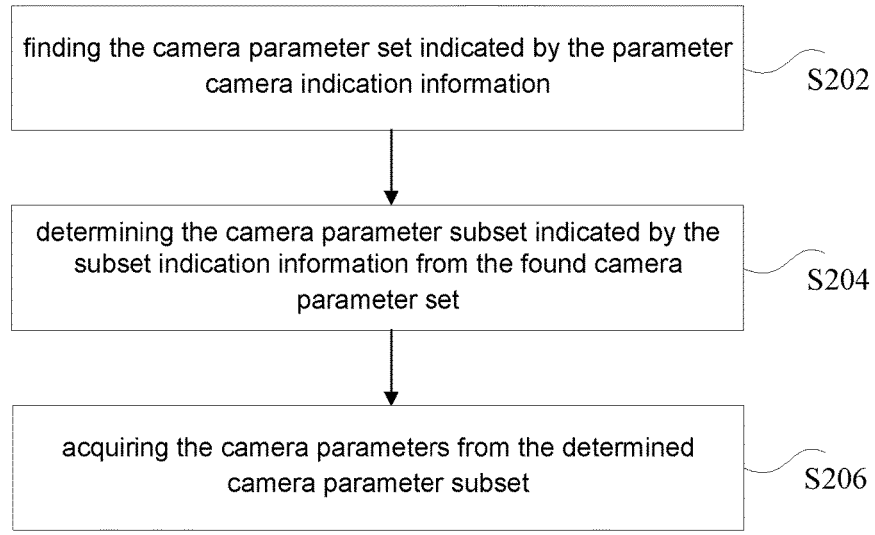
FIG. 2 is a flowchart of acquiring camera parameters according to another embodiment of the present disclosure.

In order to reduce information carried in the slice bitstream as much as possible, when the camera parameter set only includes one camera parameter subset, subset indication information for indicating the camera parameter subset will not be carried, and is carried only when there are two or more than two camera parameter subsets in the camera parameter set. In a preferred implementation mode, under the condition that the camera parameter set includes two or more than two camera parameter subsets and the slice bitstream also carries the subset indication information for indicating the camera parameter subsets, as shown in FIG. 2, the step of acquiring the camera parameters from the camera parameter set indicated by the parameter set indication information includes:

Step 202: searching for the camera parameter set indicated by the parameter set indication information;

Step 204: the camera parameter subset indicated by the subset indication information is determined from the found camera parameter set; and Step 206: the camera parameters are acquired from the determined camera parameter subset.

Preferably, the camera parameter subsets can further be divided according to different viewpoints or different camera parameter types. For example, each camera parameter set can include: V*F*M camera parameters.

Wherein, V represents the number of the viewpoints included in the camera parameter set, F represents the number of the camera parameter subsets included in the camera parameter set, M represents the number of the types of the camera parameters included in the camera parameter set, and V, F and M are positive integers. That is, the camera parameter set A includes three camera parameter subsets, and each camera parameter subset includes two different types of parameters (that is, V=4, F=3, M=2) of four viewpoints. Correspondingly, the indication information for indicating the viewpoints is required to be carried in the slice bitstream, so that the camera parameters used for decoding can be more accurately determined. In a preferred implementation mode, the slice bitstream can also carry the viewpoint indication information for indicating the viewpoints and the subset indication information for indicating the camera parameter subsets.

In a preferred implementation mode, the step of storing one or more camera parameters obtained by decoding as a camera parameter set includes: storing the one or more camera parameters in an array form, wherein one array corresponds to one camera parameter set. For example: the above-mentioned camera parameter set A is taken as an example, the array is recorded as CP0 for representing the camera parameter set A, and CP0[v][f][m] represents the camera parameter of the mth type corresponding to a view order index v in the fth camera parameter subset of the camera parameter set A, wherein v is a positive integer not more than 4, f is a positive integer not more than 3 and m is a positive integer not more than 2. Wherein, 0 represents the identification number of the camera parameter set A. Of course, the adoption of numbers as marks for description in the embodiment is not intended to limit the present disclosure, and letters or bit strings can also be adopted for identification. For example, there are totally four viewpoints (identified by 0000), one bit corresponds to one viewpoint, and bit position corresponding to the corresponding viewpoint is changed into 1. For example, if a current slice bitstream corresponds to the viewpoint 2, the slice bitstream is represented by 0100.

Figure 3:
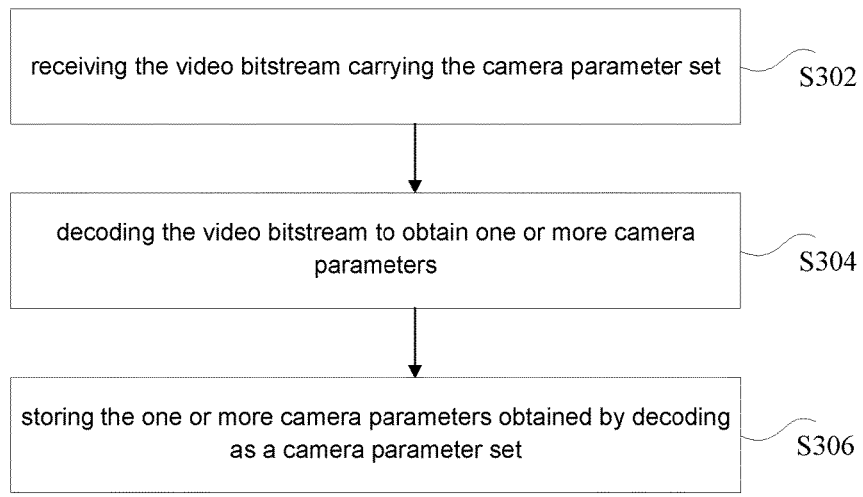
FIG. 3 is a flowchart of acquiring camera parameters according to still another embodiment of the present disclosure.

The camera parameter set on a decoding side can be extracted from contents of one or more frames by a coding side. For example, a corresponding camera parameter of a current frame is acquired, and can be taken as a camera parameter set which can correspondingly be numbered as 0, and then the camera parameter set is encoded in a video bitstream to be transmitted, and is transmitted to the decoding end. When there is a new frame, the same manner is adopted for coding and transmission. The camera parameter set is recovered by corresponding decoding on the decoding side. In a preferred implementation mode, before the camera parameters are acquired from the camera parameter set indicated by the parameter set indication information, as shown in FIG. 3, the method further includes:

Step 302: the video bitstream carrying the camera parameter set is received;

Step 304: the video bitstream is decoded to obtain one or more camera parameters; and Step 306: the one or more camera parameters obtained by decoding are stored as a camera parameter set.

The embodiment also provides a manner for updating the camera parameter set stored on the decoding side, thereby periodically and effectively updating the camera parameters on the decoding side, and the main idea is because each camera parameter set has own corresponding identification number. The coding side sequentially uses numbers one by one, and performs numbering from the first number after all the numbers are used, and correspondingly, if a received camera parameter set corresponding to a certain identification number has been stored on the decoding side, the currently stored camera parameter set is replaced by the camera parameter set obtained by decoding, thereby realizing the effective updating of the camera parameter set. In a preferred implementation mode, storing the one or more camera parameters obtained by decoding as the camera parameter set includes: under the condition that a parameter set identification number of the camera parameter set obtained by decoding is the same as that of the camera parameter set which has been stored, storing the camera parameter set obtained by decoding by replacing the stored camera parameter set with the same parameter set identification number.

Figure 4:
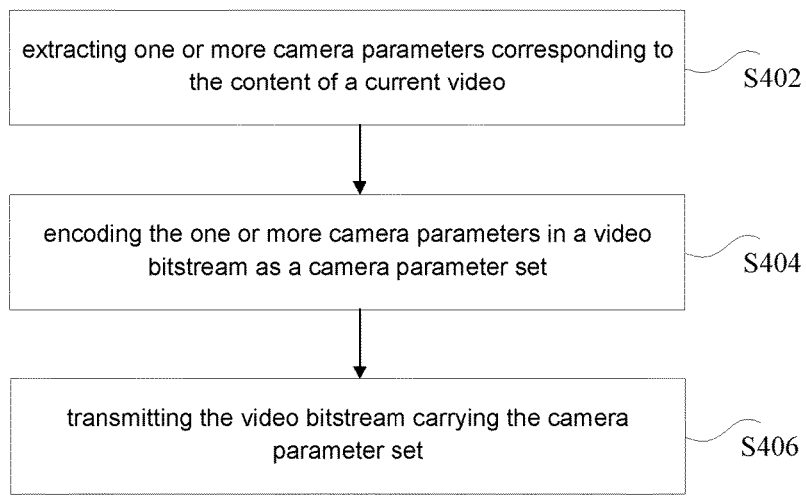
FIG. 4 is a flowchart of an encoding method based on the generation of a camera parameter set on a coding side according to an embodiment of the present disclosure.

The embodiment of the present disclosure also provides a preferred encoding method, which is mainly based on a description about the generation of a camera parameter set on a coding side, and as shown in FIG. 4, includes the following steps:

Step 402: one or more camera parameters corresponding to the content of the current video are extracted;

Step 404: the one or more camera parameters in a video bitstream are encoded as a camera parameter set; and Step 406: the video bitstream carrying the camera parameter set is transmitted.

Preferably, the camera parameter set includes at least one camera parameter subset, and one slice bitstream refers to one camera parameter subset.

The camera parameter subsets can further be divided according to different viewpoints or different camera parameter types. For example, each camera parameter set can include: V*F*M camera parameters.

Wherein, V represents the number of the viewpoints included in the camera parameter set, F represents the number of the camera parameter subsets included in the camera parameter set, M represents the number of the types of the camera parameters included in the camera parameter set, and V, F and M are positive integers. That is, a camera parameter set A includes three camera parameter subsets, and each camera parameter subset includes two different types of parameters (that is, V=4, F=3, M=2) of four viewpoints. Correspondingly, the indication information for indicating the viewpoints is required to be carried in the slice bitstream, so that the camera parameters used for decoding can be more accurately determined. In a preferred implementation mode, the slice bitstream can also carry the viewpoint indication information for indicating the viewpoints and the subset indication information for indicating the camera parameter subsets.

Figure 5:
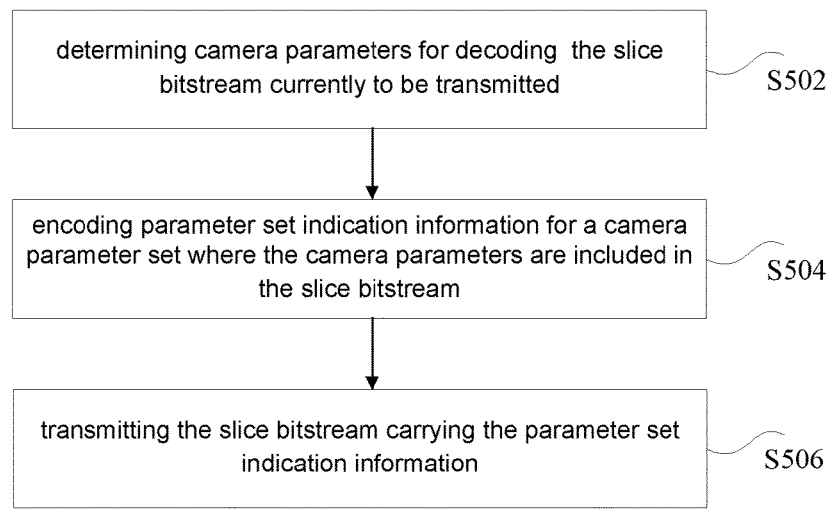
FIG. 5 is a flowchart of an encoding method of carrying camera parameter set indication information in a slice bitstream according to an embodiment of the present disclosure.

The embodiment of the present disclosure also provides another encoding method, which is mainly based on a description about the carrying of camera parameter set indication information in a slice bitstream, and as shown in FIG. 5, includes the following steps:

Step 502: the camera parameters used for decoding a slice bitstream currently to be transmitted are determined;

Step 504: the parameter set indication information for a camera parameter set where the camera parameters are included is encoded in the slice bitstream; and Step 506: the slice bitstream carrying the parameter set indication information is transmitted.

In the embodiment, when there are two or more than two camera parameter subsets in the camera parameter set, coding the parameter set indication information for the camera parameter set where the camera parameters are included in the slice bitstream includes: carrying the parameter set indication information and subset indication information for indicating camera parameter subsets in the slice bitstream. That is, in a process of coding the slice bitstream, if the camera parameter set is divided into multiple camera parameter subsets, the corresponding subset indication information can be encoded in the slice bitstream, so that the camera parameters used for decoding the slice bitstream can be effectively determined.

Preferably, each camera parameter set includes V*F*M camera parameters, wherein V represents the number of viewpoints included in the camera parameter set, F represents the number of the camera parameter subsets included in the camera parameter set, M represents the number of the types of the camera parameters included in the camera parameter set, and V, F and M are positive integers. When the camera parameter set includes the V*F*M camera parameters, viewpoint indication information for indicating the viewpoints and the subset indication information for indicating the camera parameter subsets can be carried in the slice bitstream.

Preferably, in each preferred implementation mode, one slice bitstream refers to one camera parameter subset, and one camera parameter subset can correspond to one or more slice bitstreams, that is, one camera parameter subset can be shared by multiple slice bitstreams.

Figure 6:
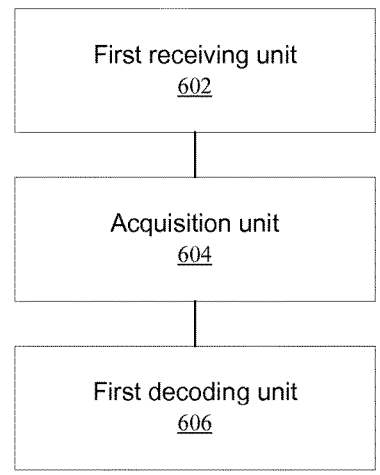
FIG. 6 is a structure diagram of a decoding device according to an embodiment of the present disclosure.

The embodiment also provides a decoding device and a coding device, which are configured to implement the embodiments and the preferred implementation modes, and what has been described will not be repeated. For example, a term "unit" or "module", used below, is a combination of software and/or hardware for realizing preset functions. The devices described in the following embodiment are preferably implemented by software, but the implementation of the devices with hardware or the combination of software and hardware is also possible and conceived. FIG. 6 is a structure diagram of a decoding device according to an embodiment of the present disclosure, and as shown in FIG. 6, the decoding device includes: a first receiving unit 602, an acquisition unit 604 and a first decoding unit 606. The structure is described below.

The first receiving unit 602 is configured to receive a slice bitstream, wherein the slice bitstream carries parameter set indication information for indicating a camera parameter set; or a parsing unit is configured to parse the slice bitstream to obtain the parameter set indication information for indicating the camera parameter set in the slice bitstream;

the acquisition unit 604 is coupled with the first receiving unit 602, and is configured to acquire camera parameters from the camera parameter set indicated by the parameter set indication information; and the first decoding unit 606 is coupled with the acquisition unit 604, and is configured to decode the slice bitstream according to the acquired camera parameters.

In a preferred implementation mode, the acquisition unit includes: a first searching module, configured to search for the camera parameter set indicated by the parameter camera indication information; a second searching module, configured to, under the condition that the camera parameter set includes two or more than two camera parameter subsets and the slice bitstream also carries subset indication information for indicating the camera parameter subsets, determine the camera parameter subset indicated by the subset indication information from the found camera parameter set; and an acquisition module, configured to acquire the camera parameters from the determined camera parameter subset.

In a preferred implementation mode, the device further includes: a second receiving unit, configured to, before the camera parameters are acquired from the camera parameter set indicated by the parameter set indication information, receive a video bitstream carrying the camera parameter set; a second decoding unit, configured to decode the video bitstream to obtain one or more camera parameters; and a storage unit, configured to store the one or more camera parameters obtained by decoding as the camera parameter set.

In a preferred implementation mode, the storage unit includes: a storage module, configured to, under the condition that a parameter set identification number of the camera parameter set obtained by decoding is the same as that of a camera parameter set which has been stored, store the camera parameter set obtained by decoding by replacing the stored camera parameter set with the same parameter set identification number.

Figure 7:
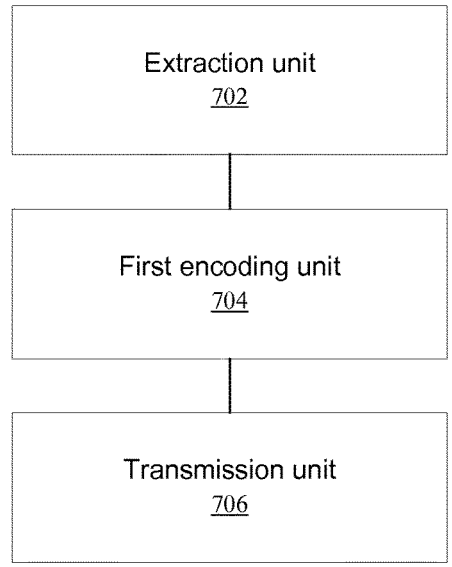
FIG. 7 is a structure diagram of a decoding device according to another embodiment of the present disclosure.

The embodiment also provides an encoding device, as shown in FIG. 7, the encoding device includes: an extraction unit 702, configured to extract one or more camera parameters corresponding to a content of a current frame; a first encoding unit 704, configured to encode the one or more camera parameters in a video bitstream as a camera parameter set; and a transmission unit 706, configured to transmit the video bitstream carrying the camera parameter set.

Preferably, the encoding unit in the coding device includes: an encoding module, configured to encode the one or more camera parameters in the video bitstream as the camera parameter set, wherein the camera parameter set includes at least one camera parameter subset.

Figure 8:
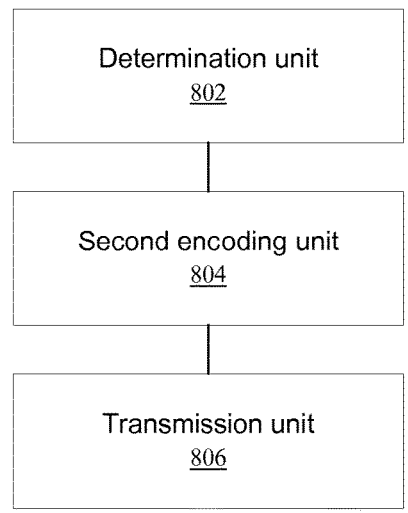
FIG. 8 is a structure diagram of a coding device according to an embodiment of the present disclosure.

The embodiment also provides another encoding device, as shown in FIG. 8, the encoding device includes: a determination unit 802, configured to determine camera parameters used for decoding a slice bitstream currently to be transmitted; a second encoding unit 804, configured to encode parameter set indication information for a camera parameter set, where the camera parameters are included, in the slice bitstream; and a transmission unit 806, configured to transmit the slice bitstream carrying the parameter set indication information. Wherein, the second encoding unit 804 includes: an encoding module, configured to, under the condition that the camera parameter set includes two or more than two camera parameter subsets, carry the parameter set indication information and subset indication information for indicating the camera parameter subsets in the slice bitstream.

It is worth noting that the camera parameter sets involved in the coding devices and the decoding device are consistent with those involved in the encoding method and the decoding method, and are not repeated here.

In the present disclosure, other embodiments are also provided for specifically describing the present disclosure.

The embodiments of the present disclosure provide a video bitstream, and encoding/decoding methods and corresponding encoding/decoding devices for the bitstream. The methods and the devices are applied to various types of camera parameters, for example: camera intrinsic parameters such as local lengths, camera extrinsic parameters such as positions and parameters such as furthest depth plane and nearest depth planes of depth data for the viewpoints.

Each camera parameter set in the embodiment of the present disclosure includes V*F*M camera parameters, wherein V represents the number of the viewpoints included in the camera parameter set, F represents the number of camera parameter subsets included in the camera parameter set, and M represents the number of the types of the camera parameters included in the camera parameter set; and the camera parameter set also includes a camera parameter set identification number C of the camera parameter set, V, F and M are positive integers, and C is a non-negative integer.

In the embodiment of the present disclosure, the camera parameter set identification number is different from a frame number. The camera parameter set identification number included in the camera parameter set is one of the parameters in the camera parameter set, and represents a property of the camera parameter set, i.e. which is the camera parameter set identification number of the camera parameter set. The camera parameter set identification number included in a slice is one of parameters of the slice, and represents a property of the slice, i.e. which is the camera parameter set identification number of the camera parameter set referred to by the slice. In other words, the camera parameter set with its the camera parameter set identification number equal to that included in the slice is the camera parameter set referred to by the slice. The frame number is one of the parameters of the slice, and represents the property of the slice, i.e. which is the frame the slice belonging to, and is usually used for methods and devices for reference frame management, motion prediction, motion compensation and the like. No frame numbers are used in the embodiment of the present disclosure.

A camera parameter subset index number D, D being a non-negative integer, in the embodiment of the present disclosure is also different from the frame number. The camera parameter subset index number included in the slice is one of the parameters of the slice, and represents the property of the slice. The camera parameter set identification number and the camera parameter subset index number in the slice determine which camera parameter subset of which camera parameter set is referred to by the slice. In other words, the camera parameter set with its the camera parameter set identification number equal to that included in the slice is the camera parameter set referred to by the slice, and the camera parameter subset with its camera parameter subset index number in the camera parameter set equal to that included in the slice is the camera parameter subset referred to by the slice. Similarly, the frame number is one of the parameters of the slice, and represents the property of the slice, i.e. which is the frame the slice belonging to, and is usually used for methods and devices for reference frame management, motion prediction, motion compensation and the like. No frame numbers are used in the embodiment of the present disclosure. The video bitstream in the embodiment of the present disclosure may also include information such as an SPS and a PPS. As mentioned in the background, the slice can acquire a view order index of the viewpoint where the slice is located according to the information.

Based on the above description, the present disclosure is further described below with reference to multiple specific preferred embodiments.

Embodiment 1

In the embodiment, an encoding method for a video bitstream is provided, wherein a video sequence in the embodiment has three camera parameter subsets, each camera parameter subset includes two different types of parameters of four viewpoints, and here, nearest depth plane parameters and furthest depth plane parameters are taken as the two different types of parameters for example.

First, all the three camera parameter subsets are divided into a camera parameter set A (that is, V=4, F=3, M=2); and the division information of a camera parameter set is adopted for division.

Then, a camera parameter set identification number is required to be designated to the camera parameter set A, and here, the identification number can be designated to be 0 (that is, C=0), and is encoded and written into a camera parameter set bitstream.

Next, the camera parameter set A includes two two-dimensional camera parameter matrix of which each consists of 4*3 camera parameters, all the two-dimensional camera parameter matrixes are encoded, and preferably, one or more of the following four methods can be adopted, but not limited to, can be adopted for coding:

Method 1: direct coding;
Method 2: Run-length encoding;
Method 3: unidirectional predictive coding; and
Method 4: bidirectional predictive coding.

After bitstreams obtained by encoding the two-dimensional camera parameter matrixes are written into the camera parameter set bitstream, the camera parameter set bitstream is written into the video bitstream to finally obtain the video bitstream including the camera parameter set bitstream.

In the embodiment,
1) The number V of the viewpoints may be any positive integer, such as 1, 5 and 23.
2) The number F of the camera parameter subsets may also be any positive integer.
3) The number M of the types of the camera parameters may also be any positive integer, and besides the nearest depth plane parameters and the furthest depth plane parameters, other types of camera parameters can also be included, for example: camera intrinsic parameters such as local lengths and camera extrinsic parameters such as positions.
4) F camera parameter subsets can be divided into P camera parameter sets, wherein P is any positive integer not more than F. For example, the three camera parameter subsets in the embodiment can also be divided into two camera parameter sets, wherein the camera parameter set A includes one camera parameter subset, and the camera parameter set B includes the other two camera parameter subsets. Camera parameter set identification numbers of the two camera parameter sets should be different, for example, the camera parameter set identification number of the camera parameter set A is 0, and the camera parameter set identification number of the camera parameter set B is 1; and the two camera parameter sets are encoded respectively, and camera parameter set bitstreams are written into the video bitstream to finally obtain the video bitstream including the camera parameter set bitstreams.

Embodiment 2

In the preferred embodiment, another encoding method for a video bitstream is provided. In the embodiment, a video sequence has five camera parameter subsets, each camera parameter subset includes three different types of parameters of three viewpoints, and here, nearest depth plane parameters, furthest depth plane parameters and focal length parameters are taken as the three different types of parameters for example.

First, all the five camera parameter subsets are divided into two camera parameter sets, wherein the camera parameter set A includes any four of the five camera parameter subsets (that is, VA=3, FA=4, MA=3), and the camera parameter set B includes the other camera parameter subset (that is, VB=3, FB=1, MB=3); and the division information of the camera parameter sets is adopted for division.

Then, a camera parameter set identification number is required to be designated to the camera parameter set A, and here, the identification number can be designated to be 1 (that is, CA=1), and is encoded and written into a camera parameter set bitstream.

Next, the camera parameter set A includes four two-dimensional camera parameter matrix of which each consists of 4*3 camera parameters, all the two-dimensional camera parameter matrixes are encoded, and preferably, one or more of the following four methods can be adopted, but not limited to, can be adopted for coding:

Method 1: direct coding;
Method 2: Run-length encoding;
Method 3: unidirectional predictive coding; and
Method 4: bidirectional predictive coding.

After bitstreams obtained by coding the two-dimensional camera parameter matrixes are written into the camera parameter set bitstream, the camera parameter set B is encoded by a similar method, and it is worth noting that a camera parameter set identification number of the camera parameter set B should be different from that of the camera parameter set A, can be designated to be 2 (that is, CB=2), and is encoded and written into the camera parameter set bitstream.

In addition, the video bitstream also includes three slice bitstreams. According to the division information of the camera parameter sets, it can be determined that: the camera parameters corresponding to a slice 1 are included in the second camera parameter subset in the camera parameter set A, then the camera parameter set identification number of the camera parameter set referred to by the slice 1 is 1, a camera parameter subset index number of the camera parameter subset is 2, and the camera parameter set identification number and the camera parameter subset index number are encoded into a slice bitstream of the slice 1; the camera parameters corresponding to a slice 2 are included in the third camera parameter subset in the camera parameter set A, then the camera parameter set identification number of the camera parameter set referred to by the slice 2 is 1, a camera parameter subset index number of the camera parameter subset is 3, and the camera parameter set identification number and the camera parameter subset index number are encoded into a slice bitstream of the slice 2; the camera parameters corresponding to a slice 3 are included in the first camera parameter subset in the camera parameter set B, then the camera parameter set identification number of the camera parameter set referred to by the slice 3 is 2, and is encoded into a slice bitstream of the slice 3, and here, because the camera parameter set 2 only includes one camera parameter subset, a camera parameter subset index number of the camera parameter subset referred to by the slice 3 is not required to be coded into the slice bitstream of the slice 3, and a coding end and a decoding end default that the camera parameter subset index number of the camera parameter subset is a default value 1. By the coding process, the video bitstream including the three slice bitstreams is obtained, and each slice bitstream includes the camera parameter set identification number of the camera parameter set referred to by the corresponding slice and the camera parameter subset index number of the camera parameter subset referred to by the slice.

Finally, camera parameter bitstreams obtained by coding the two camera parameter sets are written into the video bitstream including the three slice bitstreams to finally obtain the video bitstream including the camera parameter set bitstreams.

In the embodiment,

1) The number V of the viewpoints may be any positive integer, such as 1, 5 and 23.

2) The number F of the camera parameter subsets may also be any positive integer.

3) The number M of the types of the camera parameters may also be any positive integer, and besides the nearest depth plane parameters, the furthest depth plane parameters and the focal length parameters, other types of camera parameters such as camera positions can also be included.

4) F camera parameter subsets can be divided into P camera parameter sets, wherein P is any positive integer not more than F, for example, the five camera parameter subsets in the embodiment can also be divided into five camera parameter sets, and then the camera parameter set identification numbers of the camera parameter sets referred to by the slices and the camera parameter subset index numbers of the camera parameter subsets referred to by the slices in the slice bitstreams should be correspondingly changed.

5) The camera parameter subset index number (the identification number is 1) of the camera parameter subset referred to by the slice 3 can also be coded into the slice bitstream of the slice 3, and the use of a default value mechanism is avoided.

6) The number S of the slice bitstreams included in the video bitstream may also be any positive integer.

Embodiment 3

In the preferred embodiment, a decoding method for a video bitstream is provided. The video bitstream in the embodiment includes a camera parameter set A; the camera parameter set A includes three camera parameter subsets, and each camera parameter subset includes two different types of parameters (that is, V=4, F=3, M=2) of four viewpoints, and the camera parameter set A also includes its camera parameter set identification number which is 0 (that is C=0); and here, nearest depth plane parameters and furthest depth plane parameters are taken as the two different types of parameters for example.

A camera parameter set bitstream is extracted from the video bitstream, and includes the camera parameter set A, and the camera parameter set A is decoded: (1) obtain a camera parameter set identification number C=0 of the camera parameter set A is obtained; and (2) a camera parameter array including 4*3*2 elements is obtained, wherein each element of the array is a camera parameter, and the array is recorded as CP0 (wherein the subscript 0 represents that the array is obtained by decoding the camera parameter set of which the camera parameter set identification number is 0), and then CP0[$v$][$f$][$m$] represents the camera parameter of the mth type corresponding to a view order index v in the fth camera parameter subset of the camera parameter set A, wherein v is a positive integer not more than 4, f is a positive integer not more than 3 and m is a positive integer not more than 2.

By the embodiment, the camera parameter set bitstream is decoded to obtain the camera parameter set identification number of the camera parameter set and the camera parameter array.

In the embodiment,

1) The number V of the viewpoints may be any positive integer, such as 1, 5 and 23.

2) The number F of the camera parameter subsets may also be any positive integer.

3) The number M of the types of the camera parameters may also be any positive integer, and besides the nearest depth plane parameters and the furthest depth plane parameters, other types of camera parameters can also be included, for example: camera intrinsic parameters such as local lengths and camera extrinsic parameters such as positions.

4) The number of the camera parameter sets may also be any positive integer, and when the number of the camera parameter sets in the video bitstream is more than 1, each camera parameter set is decoded; the camera parameters decoded from the camera parameter sets with different camera parameter set identification numbers should be included in different camera parameter arrays, that is, different camera parameter set identification numbers correspond to different camera parameter arrays; and when the camera parameter set corresponding to a certain identification number is decoded, if the camera parameter array corresponding to the identification number has existed, the camera parameter array is deleted to ensure that the number of the camera parameter arrays corresponding to each identification number does not exceed 1.

Embodiment 4

In the preferred embodiment, a decoding method for a video bitstream is provided. In the embodiment, the video bitstream includes two camera parameter sets A and B; the camera parameter set A includes four camera parameter subsets, each camera parameter subset includes three different types of parameters (that is, VA=3, FA=4, MA=3) of three viewpoints, and the camera parameter set A also includes its camera parameter set identification number which is 1 (that is, CA=1); the camera parameter set B includes one camera parameter subset, each camera parameter subset includes three different types of parameters (that is, VB=3, FB=1, MB=3) of three viewpoints, and the camera parameter set B also includes its camera parameter set identification number which is 2 (that is, CB=2); and here, nearest depth plane parameters, furthest depth plane parameters and focal length parameters are taken as the three different types of parameters for example.

The video bitstream also includes three slice bitstreams, and the slice bitstream of a slice 1 includes the camera parameter set identification number of the camera parameter set referred to by the slice 1 and a camera parameter subset index number of the camera parameter subset referred to by the slice 1, which are 1 and 2 respectively; the slice bitstream of a slice 2 includes the camera parameter set identification number of the camera parameter set referred to by the slice 2 and a camera parameter subset index number of the camera parameter subset referred to by the slice 2, which are 1 and 3 respectively; and the slice bitstream of a slice 3 includes the camera parameter set identification number of the camera parameter set referred to by the slice 3, which is 2, and a camera parameter subset index number of the camera parameter subset referred to by the slice 3 is not included in the slice bitstream of the slice 3.

A camera parameter set bitstream is extracted from the video bitstream, and includes the camera parameter sets A and B, and the camera parameter sets A and B are decoded: (1) the camera parameter set identification number CA=1 of the camera parameter set A and the camera parameter set identification number CB=2 of the camera parameter set B are obtained; (2) a camera parameter array including 3*4*3 elements is obtained, wherein each element of the array is a camera parameter included in the camera parameter set A, and the array is recorded as CP1 (wherein the subscript 1 represents that the array is obtained by decoding the camera parameter set of which the camera parameter set identification number is 1), and then CP1[$v$][$f$][$m$] represents the camera parameter of the mth type corresponding to a view order index v in the fth camera parameter subset of the camera parameter set A, wherein v is a positive integer not more than 3, f is a positive integer not more than 4 and m is a positive integer not more than 3; and (3) a camera parameter array including 3*1*3 elements is obtained, wherein each element of the array is a camera parameter included in the camera parameter set B, and the array is recorded as CP2 (wherein the subscript 2 represents that the array is obtained by decoding the camera parameter set of which the camera parameter set identification number is 2), and then CP2[$v$][$f$][$m$] represents the camera parameter of the mth type corresponding to a view order index v in the fth camera parameter subset of the camera parameter set B, wherein v is a positive integer not more than 3, f is a positive integer not more than 1 and m is a positive integer not more than 3;

the three slice bitstreams are extracted from the video bitstream, and are decoded:

(1) A view order index E of the viewpoint where each of the three slices is located is obtained, wherein E is a non-negative integer, the slice can deduce a decoding sequence of the viewpoint where the slice is located as the view order index of the viewpoint where the slice is located by virtue of the view order index of the viewpoint where the slice is located and a viewpoint decoding sequence identified in an SPS referred to by the slice, the view order index of the viewpoint where the slice is located can be directly obtained if being included in the corresponding slice bitstream, the view order index of the viewpoint where the slice 1 is located is set to be 2, the view order index of the viewpoint where the slice 2 is located is set to be 3, and the view order index of the viewpoint where the slice 3 is located is set to be 2;

(2) The camera parameter set identification numbers of the camera parameter sets referred to by the three slices and the camera parameter subset index numbers of the camera parameter subsets referred to by the three slices are obtained, wherein, in the embodiment, the camera parameter set identification number of the camera parameter set referred to by the slice 1 is 1, the camera parameter subset index number of the camera parameter subset referred to by the slice 1 is 2, the camera parameter set identification number of the camera parameter set referred to by the slice 2 is 1, the camera parameter subset index number of the camera parameter subset referred to by the slice 2 is 3, the camera parameter set identification number of the camera parameter set referred to by the slice 3 is 2, and the camera parameter subset index number of the camera parameter subset referred to by the slice 3 is 1 (because the camera parameter subset index number of the camera parameter subset referred to by the slice 3 is not included in the slice bitstream of the slice 3, the camera parameter subset index number of the camera parameter subset referred to by the slice 3 is set to be a default value 1); and (3) For each slice, M camera parameters are acquired from the camera parameter array obtained by decoding the camera parameter set referred to by the slice as the camera parameters corresponding to the slice by virtue of the camera parameter set identification number of the camera parameter set referred to by the slice, the camera parameter subset index number of the camera parameter subset referred to by the slice and the view order index of the viewpoint where the slice is located. In the embodiment, the camera parameter set identification number of the camera parameter set referred to by the slice 1 is 1, the camera parameter subset index number of the camera parameter subset referred to by the slice 1 is 2, and the view order index of the viewpoint where the slice 1 is located is 2, so that the three camera parameters corresponding to the slice 1 are included in the array CP1[2][2]; the camera parameter set identification number of the camera parameter set referred to by the slice 2 is 1, the camera parameter subset index number of the camera parameter subset referred to by the slice 2 is 3, and the view order index of the viewpoint where the slice 2 is located is 3, so that the three camera parameters corresponding to the slice 2 are included in the array CP1[3][3]; and the camera parameter set identification number of the camera parameter set referred to by the slice 3 is 2, the camera parameter subset index number of the camera parameter subset referred to by the slice 3 is 1, and the view order index of the viewpoint where the slice 3 is located is 2, so that the three camera parameters corresponding to the slice 2 are included in the array CP2[2][1].

By the embodiment, the two camera parameter set bitstreams are decoded to obtain the identification numbers of the camera parameter sets and two camera parameter arrays, the three slice bitstreams are decoded, and meanwhile, each slice acquires three camera parameters from the camera parameter array obtained by decoding the camera parameter set referred to by the slice as the camera parameters corresponding to the slice.

In the embodiment,

1) The number V of the viewpoints may be any positive integer, such as 1, 5 and 23.

2) The number F of the camera parameter subsets may also be any positive integer.

3) The number M of the types of the camera parameters may also be any positive integer, and besides the nearest depth plane parameters, the furthest depth plane parameters and the focal length parameters, other types of camera parameters such as camera positions can also be included.

4) The number of the camera parameter sets may also be any positive integer, and when the number of the camera parameter sets in the video bitstream is more than 1, each camera parameter set is decoded; the camera parameters obtained by decoding the camera parameter sets with different camera parameter set identification numbers should be included in different camera parameter arrays, that is, different camera parameter set identification numbers correspond to different camera parameter arrays; and when the camera parameter set corresponding to a certain identification number is decoded, if the camera parameter array corresponding to the identification number has existed, the camera parameter array is deleted to ensure that the number of the camera parameter arrays corresponding to each identification number does not exceed 1.

5) The number S of the slice bitstreams included in the video bitstream may also be any positive integer.

6) The slice bitstream of the slice 3 can also include the camera parameter subset index number of the camera parameter subset referred to by the slice 3, the use of a default value mechanism is avoided, and then the camera parameter subset index number of the camera parameter subset referred to by the slice 3 is that of the camera parameter subset included in the slice bitstream of the slice 3.

Embodiment 5

Figure 9:
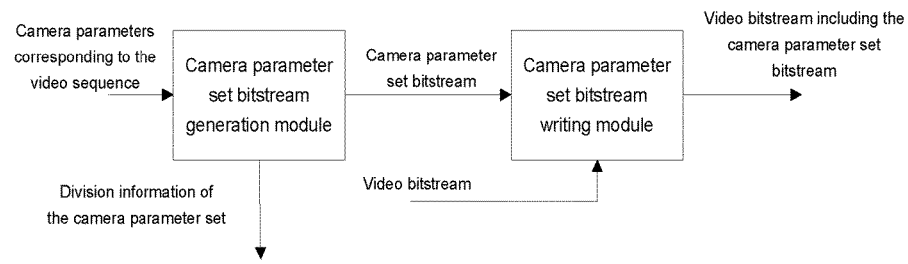
FIG. 9 is a structure diagram of a coding device for a video bitstream in an embodiment of the present disclosure.

In the embodiment, a coding device for a video bitstream is provided. FIG. 9 is a preferred structure diagram of a coding device for a video bitstream. The device includes two modules: 1) a camera parameter set bitstream generation module (configured to realize a function of the extraction unit 702) configured to divide camera parameters corresponding to a video sequence into at least one camera parameter set and code the camera parameter set into a camera parameter bitstream, and 2) a camera parameter set bitstream writing module (configured to realize a function of the first encoding unit 704) configured to write the camera parameter set bitstream into the video bitstream. The two modules are specifically described below.

1) The input of the camera parameter set bitstream generation module (equivalent to the extraction unit 702) is the camera parameters corresponding to the video sequence, while the output is the camera parameter set bitstream and the division information of the camera parameter set, and the function realized by the camera parameter set bitstream generation module and an implementation mode are the same as those for dividing the camera parameters corresponding to the video sequence into at least one camera parameter set and coding the camera parameter set into the camera parameter set bitstream in the encoding method for the video sequence.

2) The input of the camera parameter set bitstream writing module (equivalent to the first encoding unit 704) is the camera parameter set bitstream and the video bitstream, while the output is the video bitstream including the camera parameter set bitstream, and the function realized by the camera parameter set bitstream writing module and an implementation mode are the same as those for writing the camera parameter set bitstream into the video bitstream in the encoding method for the video sequence.

Embodiment 6

Figure 10:
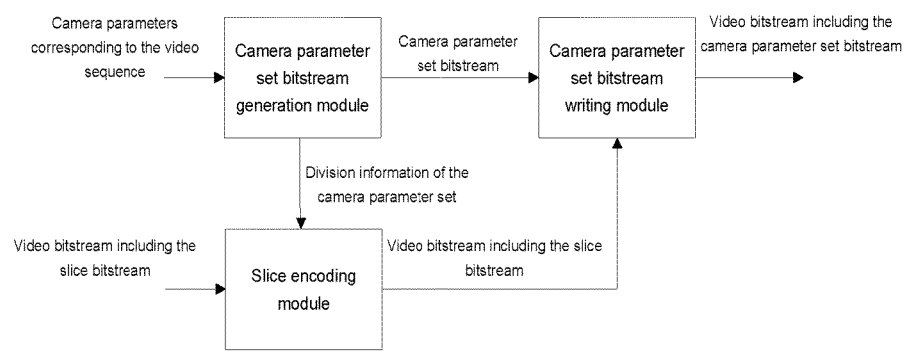
FIG. 10 is a structure diagram of a coding device for a video bitstream in another embodiment of the present disclosure.

In the embodiment, a coding device for a video bitstream is provided. FIG. 10 is another structure diagram of a coding device for a video bitstream. The device includes three modules: 1) a camera parameter set bitstream generation module configured to divide camera parameters corresponding to a video sequence into at least one camera parameter set and code the camera parameter set into a camera parameter set bitstream, 2) a slice encoding module (equivalent to the second encoding unit 804) configured to write a camera parameter set identification number C of the camera parameter set referred to by a slice and a camera parameter subset index number D of a camera parameter subset referred to by the slice into the video bitstream, and 3) a camera parameter set bitstream writing module configured to write the camera parameter set bitstream into the video bitstream. The three modules are specifically described below.

1) The input of the camera parameter set bitstream generation module is the camera parameters corresponding to the video sequence, while the output is the camera parameter set bitstream and the division information of the camera parameter set, and a function realized by the camera parameter set bitstream generation module and an implementation mode are the same as those for dividing the camera parameters corresponding to the video sequence into at least one camera parameter set and coding the at least one camera parameter set into the camera parameter set bitstream in the encoding method for the video sequence.

2) The input of the slice encoding module (equivalent to the second encoding unit 804) is the video bitstream including at least one slice bitstream and the division information of the camera parameter set, while the output is the video bitstream including the at least one slice bitstream, the slice bitstream includes the camera parameter set identification number C of the camera parameter set referred to by a slice and the camera parameter subset index number D of the camera parameter subset referred to by the slice, and a function realized by the slice encoding module and an implementation mode are the same as those for writing the camera parameter set identification number of the camera parameter set referred to by the slice and the camera parameter subset index number of the camera parameter subset referred to by the slice into the video bitstream in the encoding method for the video sequence.

3) The input of the camera parameter set bitstream writing module is the camera parameter set bitstream and the video bitstream including the slice bitstream, while the output is the video bitstream including the camera parameter set bitstream, and a function realized by the camera parameter set bitstream writing module and an implementation mode are the same as those for writing the camera parameter set bitstream into the video bitstream in the encoding method for the video sequence.

Embodiment 7

Figure 11:
FIG. 11 is a structure diagram of a decoding device for a video bitstream in an embodiment of the present disclosure.

In the embodiment, a decoding device for a video bitstream is provided. FIG. 11 is a structure diagram of a decoding device for a video bitstream. The device includes two modules: 1) a camera parameter set bitstream extraction module (equivalent to the second receiving unit) configured to extract a camera parameter set bitstream from the video bitstream, and 2) a camera parameter set bitstream decoding module (equivalent to the second decoding unit) configured to decode the camera parameter set bitstream to obtain camera parameters of a video sequence. The two modules are specifically described below.

1) The input of the camera parameter set bitstream extraction module is the video bitstream, while the output is the camera parameter set bitstream, and a function realized by the camera parameter set bitstream extraction module and an implementation mode are the same as those for extracting the camera parameter set bitstream from the video bitstream in the decoding method for the video bitstream.

2) The input of the camera parameter set bitstream decoding module is the camera parameter set bitstream, while the output is a camera parameter array of the video sequence, and a function realized by the camera parameter set bitstream decoding module and an implementation mode are the same as those for decoding the camera parameter set bitstream to obtain the camera parameter array of the video sequence in the decoding method for the video bitstream.

Embodiment 8

Figure 12:
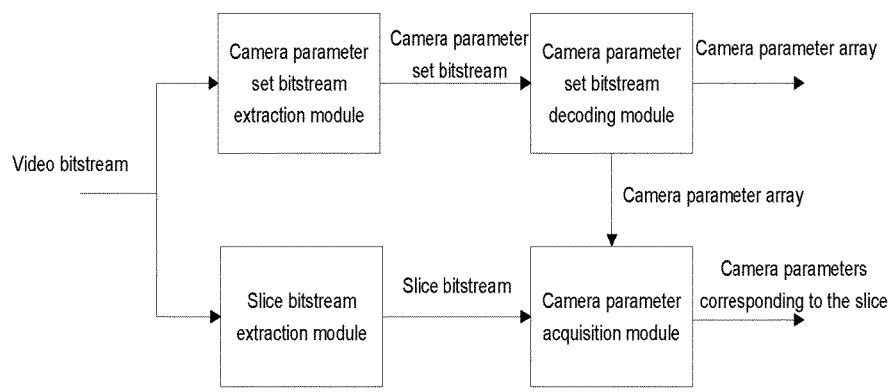
FIG. 12 is structure diagram of a decoding device for a video bitstream in another embodiment of the present disclosure.

In the embodiment, a decoding device for a video bitstream is provided. FIG. 12 is another structure diagram of a decoding device for a video bitstream. The device includes four modules: 1) a camera parameter set bitstream extraction module configured to extract a camera parameter set bitstream from the video bitstream, 2) a camera parameter set bitstream decoding module configured to decode the camera parameter set bitstream to obtain camera parameters of a video sequence, 3) a slice bitstream extraction module configured to extract a slice bitstream from the video bitstream and 4) a camera parameter acquisition module configured to acquire the camera parameters corresponding to a slice. Wherein, the camera parameter set bitstream decoding module and the camera parameter acquisition module are configured to realize functions of the first receiving unit 602 and the acquisition unit 604. The four modules are specifically described below.

1) The input of the camera parameter set bitstream extraction module is the video bitstream, while the output is the camera parameter set bitstream, and a function realized by the camera parameter set bitstream extraction module and an implementation mode are the same as those for extracting the camera parameter set bitstream from the video bitstream in the decoding method for the video bitstream.

2) The input of the camera parameter set bitstream decoding module is the camera parameter set bitstream, while the output is a video camera array of a video sequence, and a function realized by the camera parameter set bitstream decoding module and an implementation mode are the same as those for decoding the camera parameter set bitstream to obtain the camera parameter array of the video sequence in the decoding method for the video bitstream.

3) The input of the slice bitstream extraction module is the video bitstream, while the output is the slice bitstream, and a function realized by the slice bitstream extraction module and an implementation mode are the same as those for extracting the slice bitstream from the video bitstream in the decoding method for the video bitstream.

4) The input of the camera parameter acquisition module is the slice bitstream and the camera parameter array, while the output is camera parameters corresponding to the slice, and a function realized by the camera parameter acquisition module and an implementation mode are the same as those for decoding the slice bitstream and obtaining the camera parameters corresponding to the slice in the decoding method for the video bitstream.

It is worth noting that the coding and decoding devices for the video bitstream can be implemented by multiple methods, for example:

Method 1: an electronic computer is taken as hardware, and is combined with software programs with functions the same as those of the coding and decoding methods for the video bitstream for implementation.

Method 2: a single-chip microcomputer is taken as hardware, and is combined with software programs with functions the same as those of the coding and decoding methods for the video bitstream for implementation.

Method 3: a digital signal processor is taken as hardware, and is combined with software programs with functions the same as those of the coding and decoding methods for the video bitstream for implementation.

Method 4: circuits with functions the same as those of the coding and decoding methods for the video bitstream are designed for implementation.

The four methods for implementing the coding and decoding devices for the video bitstream are only described as preferred implementation modes and not intended to limit the present disclosure.

Embodiment 9

In the embodiment, a video bitstream is provided. The video bitstream includes a camera parameter set A; the camera parameter set A includes three camera parameter subsets, and each camera parameter subset includes two different types of parameters (that is, V=4, F=3, M=2) of four viewpoints, and here, nearest depth plane parameters and furthest depth plane parameters are taken as the two different types of parameters for example; and the camera parameter set A also includes its camera parameter set identification number which is 0 (that is C=0).

By the embodiment, the camera parameter set A can show the three camera parameter subsets and the two different types of camera parameters of four viewpoints, which are included therein.

In the embodiment,

1) The number V of the viewpoints included in the camera parameter set may be any positive integer, such as 1, 5 and 23.

2) The number F of the camera parameter subsets included in the camera parameter set may also be any positive integer.

3) The camera parameter set identification number of the camera parameter set may be any non-negative integer, and if there is more than one camera parameter set, the camera parameter set identification numbers of the camera parameter sets may be equal or unequal.

4) The number M of the types of the camera parameters included in the camera parameter set may also be any positive integer, and besides the nearest depth plane parameters and the furthest depth plane parameters, other types of camera parameters can also be included, for example: camera intrinsic parameters such as local lengths and camera extrinsic parameters such as positions.

Embodiment 10

In the embodiment, a video bitstream is provided. The video bitstream includes two camera parameter sets A and B; the camera parameter set A includes four camera parameter subsets, each camera parameter subset includes three different types of parameters (that is, VA=3, FA=4, MA=3) of three viewpoints, and the camera parameter set A also includes its camera parameter set identification number which is 1 (that is, CA=1); the camera parameter set B includes one camera parameter subset, each camera parameter subset includes three different types of parameters (that is, VB=3, FB=1, MB=3) of three viewpoints, and the camera parameter set B also includes its camera parameter set identification number which is 2 (that is, CB=1); and here, nearest depth plane parameters, furthest depth plane parameters and focal length parameters are taken as the three different types of parameters for example.

Preferably, the video bitstream also includes three slice bitstreams, and the slice bitstream of a slice 1 includes the camera parameter set identification number of the camera parameter set referred to by a slice 1 and a camera parameter subset index number of the camera parameter subset referred to by the slice 1, which are 1 and 2 respectively; the slice bitstream of a slice 2 includes the camera parameter set identification number of the camera parameter set referred to by the slice 2 and a camera parameter subset index number of the camera parameter subset referred to by the slice 2, which are 1 and 3 respectively; and the slice bitstream of a slice 3 includes the camera parameter set identification number of the camera parameter set referred to by the slice 3, which is 2, and a camera parameter subset index number of the camera parameter subset referred to by the slice 3 is not included in the slice bitstream of the slice 3. This shows that the slice 1 refers to the second camera parameter subset in the camera parameter set of which the identification number is 1, the slice 2 refers to the third camera parameter subset in the camera parameter set of which the identification number is 1, and the slice 3 refers to the first camera parameter subset in the camera parameter set of which the identification number is 2 (because the camera parameter subset index number of the camera parameter subset referred to by the slice 3 is not included in the slice bitstream of the slice 3, the camera parameter subset index number of the camera parameter subset referred to by the slice 3 is set to be a default value 1).

By the embodiment, the camera parameter set A can show four camera parameter subsets and three different types of camera parameters of three viewpoints, which are included therein; the camera parameter set B can show the one camera parameter subset and three different types of camera parameters of three viewpoints, which are included therein; and meanwhile, a citing relationship between the slices and the camera parameter sets is established.

In the embodiment,

1) The number V of the viewpoints included in the camera parameter set may be any positive integer, such as 1, 5 and 23.

2) The number F of the camera parameter subsets included in the camera parameter set may also be any positive integer.

3) The camera parameter set identification number of the camera parameter set may be any non-negative integer, and if there is more than one camera parameter set, the camera parameter set identification numbers of the camera parameter sets may be equal or unequal.

4) The number M of the types of the camera parameters included in the camera parameter set may also be any positive integer, and besides the nearest depth plane parameters, the furthest depth plane parameters and the focal length parameters, other types of camera parameters such as camera positions can also be included.

5) The number S of the slice bitstreams included in the video bitstream may also be any positive integer.

6) The slice bitstream of the slice 3 can also include the camera parameter subset index number of the camera parameter subset referred to by the slice 3, the use of a default value mechanism is avoided, and then the camera parameter subset index number of the camera parameter subset referred to by the slice 3 is that of the camera parameter subset included in the slice bitstream of the slice 3.

From each embodiment, compared with the prior art, the present disclosure has the advantages that the concept of camera parameter subset is disclosed, each slice refers to one camera parameter subset, that is, each slice corresponds to the camera parameters in one camera parameter subset, and the present disclosure is applied to both conditions that the camera parameters corresponding to different slices in the same frame are the same and that the camera parameters corresponding to different slices in the same frame are different; meanwhile, the camera parameters in one camera parameter subset can correspond to one slice as well as multiple slices, and can correspond to one frame as well as multiple frames, and because each camera parameter subset is only required to be transmitted once in the bitstream, the repeated transmission of the parameters is avoided, and the coding efficiency is improved.

On the other hand, the view order index of the viewpoint corresponding to the camera parameter set and the frame number of a starting frame in the viewpoint corresponding to the camera parameter set are not required to be included in the camera parameter set in each preferred implementation mode, so that the coding efficiency is further improved.

In another embodiment, software is provided, which is configured to execute technical schemes described in the embodiments and the preferred implementation modes.

In another embodiment, a storage medium is also provided, in which the software is provided, wherein the storage medium includes, but not limited to: an optical disk, a floppy disk, a hard disk, an erasable memory and the like.

From the above, it can be seen that the present disclosure has the technical effects that: one or more camera parameter sets are pre-stored at the decoding end, and the encoding end carries the indication information of the camera parameter set where the camera parameters used for decoding the slice bitstream are included in the slice bitstream, so that the decoding end can acquire the corresponding camera parameters from the locally stored camera parameter set to finish decoding according to the indication information, the technical problem of lower coding and decoding efficiency caused by the fact that the coding and decoding processes can be normally implemented by carrying the camera parameters in the slice bitstream in the prior art is solved, and a technical effect of improving the coding and decoding efficiency is achieved. Meanwhile, amount of the indication information is generally much smaller than the data volume of the camera parameters, so that information required to be carried in the slice bitstream is effectively reduced in such a manner.

Obviously, those skilled in the art should know that each module or step of the embodiment of the present disclosure can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure can have various modifications and variations. Any modifications, equivalent replacements, improvements and the like within the spirit and principle of the present disclosure shall fall within the scope of protection of the present disclosure.

What is claimed is:

1. A decoding method, comprising:
   Decoding, by a processor, a slice bitstream to obtain parameter set indication information carried in the slice bitstream and used for indicating a camera parameter set;
   acquiring, by the processor, camera parameters from the camera parameter set indicated by the parameter set indication information; and
   decoding, by the processor, the slice bitstream according to the acquired camera parameters;
   wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

2. The method according to claim 1, wherein the camera parameter set is a parameter set data structure comprising one or more of the following types of camera parameters: camera intrinsic parameters, camera extrinsic parameters, furthest depth plane parameters of depth data for viewpoints and nearest depth plane parameters of the depth data for the viewpoints.

3. The method according to claim 1, wherein the camera parameter set comprises at least one camera parameter subset, and one slice bitstream refers to one camera parameter subset, wherein the camera parameters corresponding to the different viewpoints at the same moment form a camera parameter subset.

4. The method according to claim 1, wherein, before the camera parameters are acquired from the camera parameter set indicated by the parameter set indication information, the method comprises:
   receiving a video bitstream carrying the camera parameter set;
   decoding the video bitstream to obtain one or more camera parameters; and
   storing the one or more camera parameters obtained by decoding as the camera parameter set.

5. The method according to claim 4, wherein storing the one or more camera parameters obtained by decoding as the camera parameter set comprises:
   under the condition that a parameter set identification number of the camera parameter set obtained by decoding is the same as that of a camera parameter set which has been stored, storing the camera parameter set obtained by decoding by replacing the stored camera parameter set with the same parameter set identification number.

6. An encoding method, comprising:
   determining, by a processor, camera parameters used for decoding a slice bitstream currently to be transmitted;
   encoding, by the processor, parameter set indication information for a camera parameter set, in which the camera parameters are contained, into the slice bitstream; and
   transmitting, by the processor, the slice bitstream carrying the parameter set indication information;
   wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

7. The method according to claim 6, wherein the camera parameter set is a parameter set data structure comprising camera parameters of one or more of the following types: camera intrinsic parameters, camera extrinsic parameters, furthest depth plane parameters of depth data for viewpoints and nearest depth plane parameters of the depth data for the viewpoints.

8. A decoding device, comprising: a hardware processor configured to execute program units stored on a memory, the program units comprising:
   a parsing unit, configured to decode a slice bitstream to obtain parameter set indication information in the slice bitstream for indicating a camera parameter set;
   an acquisition unit, configured to acquire camera parameters from the camera parameter set indicated by the parameter set indication information; and
   a decoding unit, configured to decode the slice bitstream according to the acquired camera parameters;
   wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

9. The device according to claim 8, wherein the camera parameter set is a parameter set data structure comprising one or more of the following types of camera parameters: camera intrinsic parameters, camera extrinsic parameters, furthest depth plane parameters of depth data for viewpoints and nearest depth plane parameters of the depth data for the viewpoints.

10. The device according to claim 8, wherein the program units further comprises:
    a receiving unit, configured to, before the camera parameters are acquired from the camera parameter set indicated by the parameter set indication information, receive a video bitstream carrying the camera parameter set;
    a decoding unit, configured to decode the video bitstream to obtain one or more camera parameters; and
    a storage unit, configured to store the one or more camera parameters obtained by decoding as the camera parameter set;
    wherein the camera parameters corresponding to the different viewpoints at the same moment form a camera parameter subset.

11. The device according to claim 10, wherein the storage unit comprises:
    a storage module, configured to, under the condition that a parameter set identification number of the camera parameter set obtained by decoding is the same as that of a camera parameter set which has been stored at present, store the camera parameter set obtained by decoding by replacing the stored camera parameter set with the same parameter set identification number.

12. An encoding device, comprising: a hardware processor configured to execute program units stored on a memory, the program units comprising:
- a determination unit, configured to determine camera parameters used for decoding a slice bitstream currently to be transmitted;
- an encoding unit, configured to encode parameter set indication information for a camera parameter set, in which the camera parameters are contained, into the slice bitstream; and
- a transmission unit, configured to transmit the slice bitstream carrying the parameter set indication information;
- wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

13. The device according to claim 12, wherein the camera parameter set is a parameter set data structure comprising one or more of the following types of camera parameters: camera intrinsic parameters, camera extrinsic parameters, furthest depth plane parameters of depth data for viewpoints and nearest depth plane parameters of the depth data for the viewpoints.

14. The method according to claim 2, wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

15. The method according to claim 3, wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

16. The method according to claim 7, wherein each of the camera parameter set comprises V*F*M camera parameters, V represents the number of the viewpoints comprised in the camera parameter set, F represents the number of the camera parameter subsets comprised in the camera parameter set, and M represents the number of the types of the camera parameters comprised in the camera parameter set, and V, F and M are positive integers, wherein the camera parameters corresponding to the different viewpoints at the same moment form a camera parameter subset.

* * * * *